United States Patent [19]
Endo et al.

[11] Patent Number: 6,071,838
[45] Date of Patent: Jun. 6, 2000

[54] SILICA GEL, SYNTHETIC QUARTZ GLASS POWDER, QUARTZ GLASS SHAPED PRODUCT MOLDING, AND PROCESSES FOR PRODUCING THESE

[75] Inventors: Hozumi Endo; Yoshio Katsuro; Akira Utsunomiya; Masaru Shimoyama, all of Kitakyushu, Japan

[73] Assignee: Mitsubishi Chemical Corporation, Tokyo, Japan

[21] Appl. No.: 08/860,716

[22] PCT Filed: Jan. 12, 1996

[86] PCT No.: PCT/JP96/00043

§ 371 Date: Nov. 4, 1997

§ 102(e) Date: Nov. 4, 1997

[87] PCT Pub. No.: WO96/21617

PCT Pub. Date: Jul. 18, 1996

[30] Foreign Application Priority Data

| Jan. 12, 1995 | [JP] | Japan | 7-003404 |
| Feb. 1, 1995 | [JP] | Japan | 7-015170 |
| Feb. 3, 1995 | [JP] | Japan | 7-017064 |

[51] Int. Cl.$^7$ .............................. C03B 19/06; C03B 20/00
[52] U.S. Cl. ................. 501/12; 501/54; 65/17.2; 65/440
[58] Field of Search ................ 501/12, 54; 423/338, 423/335; 65/17.2, 440

[56] References Cited

U.S. PATENT DOCUMENTS

| 5,145,510 | 9/1992 | Saito et al. ............... 65/17.2 |
| 5,516,350 | 5/1996 | Onoda et al. ............ 65/17.2 |
| 5,604,163 | 2/1997 | Endo et al. . |

FOREIGN PATENT DOCUMENTS 403183626A  8/1991  Japan .

*Primary Examiner*—Michael Marcheschi
*Attorney, Agent, or Firm*—Oblon, Spivak, McClelland, Maier & Neustadt, P.C.

[57] ABSTRACT

A synthetic quartz glass powder obtained by sol-gel method, wherein the number of black spot particles is at most 5 particles per 50 g, provides a high quality quartz glass shaped product with low bubble content when fused.

7 Claims, No Drawings

SILICA GEL, SYNTHETIC QUARTZ GLASS POWDER, QUARTZ GLASS SHAPED PRODUCT MOLDING, AND PROCESSES FOR PRODUCING THESE

TECHNICAL FIELD

This invention relates to a silica gel useful as a starting material for synthetic quartz of high purity and high quality and the production of the same, and a synthetic quartz glass powder, a quartz glass shaped product and processes for producing these.

BACKGROUND ART

In recent years, glass products used in the industry of optical communication, semiconductors, etc. are under very severe controls with respect to the purity of the constituting glass materials. To produce such a highly pure glass product, there are mainly the following methods: (1) a method using sand-like natural quartz powder (what is called "sand") obtained by pulverizing natural quartz; to obtain more purified ones, (2) oxygen-hydrogen flame method, a method which comprises using a lump of fume, obtained by adhesion and growth on the substrate, of the fume generated by the hydrolysis of silicon tetrachloride in the oxygen-hydrogen flame; (3) a method using a gel obtained from an organic metal compound such as alkoxysilane as a starting material, what is called solgel method.

However, these methods all have their merits and demerits. (1) When natural quartz is used as starting material, metal elements e.g. aluminum, iron, are included essentially inside quartz particle, and it is difficult to purify to the level of not more than 10 ppb even by repeating purification such as acid washing. (2) By hydrogen oxygen flame method, using tetrachlorosilane, high purification can be sought. However, as cost has difficulty to compensate industrially, mass production is not achieved.

On the other hand, (3) sol-gel method needs low cost hence mass production can be sought, but quartz glass obtained by sol-gel method generally contains fine bubbles said to derive from silanol, causing problems especially in semiconductor industries e.g. photomask, crucible for single silicon crystal drawing, and also in optical communication fields such as optical fiber causing problems such as optical loss during fiber elongation and during use and bad effects due to gas in the bubbles.

Also, in sol gel method, synthetic quartz glass powder obtained from a gel treated by steam in advance before drying, or a gel washed with water before calcination, can reduce in some degree the bubbling in the shaped glass product after fusing. However, such steam treatment needs a long time, and also there is a problem that, because the gel contains large amount of water, mechanical strength of the gel is weak, and tends to collapse and pulverize during the steam treatment. Also, relating to the water treatment before calcination, repetition of process such as the dried gel is again washed with water and dried, causes waste of energy and problem of severe cost up. As described heretofore, by the conventional methods, there are problems both technically and in view of cost, and in addition to that, the degree of preventing bubbling is not enough, so also from this point of view, these methods couldn't be used in industrial operation.

DISCLOSURE OF THE INVENTION

The present inventors have conducted extensive studies, according to the above mentioned problems. And they have found out that, inexpectedly, bubbles in the obtained glass product derive not only from silanol in the gel, but they also derive from abnormal particles included in the gel. According to the studies of the present inventors, gel obtained by sol-gel method generally has high content of carbon such as from 0.5 to 2 wt %, therefore by directly calcining a gel with such a high carbon content, black spots can be found in the obtained synthetic quartz glass powder, and furthermore bubbles appear when used at a high temperature. The present inventors have also found out that the main source of the black spot here is the scaling material, that is the silica gel formed by sol-gel reaction adhered to the inner wall of the apparatus, which exfoliates, slips out and is included in the gel product. Namely, at the inner wall of the reaction vessel, dryer, piping etc. which are employed in the sol-gel method, scale consisting of firm silica precursor is formed and adheres, and such scale contaminates silica gel formed by sol gel reaction. Particles made of such scale apparently can not be distinguished from normal silica gel, but unlike normal silica gel, is hard and firm, therefore even by afterward drying and calcining, carbon derived from organic group does not easily come off, and remains as black spot in the synthetic quartz glass powder obtained by calcining the gel. Such carbon component, when synthetic quartz glass powder is fused and processed to form a quartz glass product, burns and generates gas, therefore the obtained quartz glass product contains bubbles. The above mentioned steam treatment or water treatment is considered to have an effect that, alkoxides are hydrolyzed thoroughly so that the carbon derived from organic groups be removed and that alcohol is washed away from the fine pores of the gel, therefore the carbon content in the obtained synthetic quartz glass can be suppressed in some degree. Consequently, by fusing such a powder the obtained quartz glass shaped product contains relatively small amount of bubbles.

The present inventors have continued extensive researches according to the above described findings. And they have found out that, by reducing the amount of material stuck to the apparatus to be included to the product, and by adequate treatment to the material included to the product from the material stuck to the apparatus, a synthetic quartz powder with the aimed high quality can be obtained. Furthermore they have found out that, by fusing the synthetic quartz glass powder of the present invention with low black spot content, shaped glass product with extremely small amount of bubbles can be obtained.

Thus, it is an object of the present invention to maintain the purity and the property of the synthetic quartz glass at a very high level, and thereby obtain a shaped glass product with almost no bubbles. And such an object of the present invention is attained by a synthetic quartz glass powder obtained by a sol-gel method, wherein the number of the black spot particles is at most 5 particles per 50 g, and by a shaped glass product obtained by fusing this synthetic quartz glass powder.

Also, the present inventors have found out that, by controlling and reducing the inclusion of the abnormal particles made of the scale adhered to the inner wall of the apparatus, the aimed above described synthetic quartz glass powder of the present invention with high quality can be obtained. Namely, silica gel obtained by sol gel reaction, wherein the number of the abnormal particles detected as black spots when heated at 800° C. for 15 minutes under nitrogen gas flow, is at most 200 particles per 10 g, can easily produce the synthetic quartz glass powder of the present invention by heating to eliminate the pores. Also, such a silica gel is easily obtained by a production of silica gel by sol-gel reaction, wherein the employed reaction apparatus has the part of the inner wall which contacts with the liquid and /or silica gel said part of the inner wall having a scale layer of at most the exfoliation limit thickness.

Furthermore, the present inventors have found out that, surprisingly, to produce a synthetic quartz glass powder by eliminating the pores of the silica gel by heating, when heat treatment at a certain temperature range, namely from 100 to 600° C. is carried out so that the carbon content be no more than 2,000 ppm, then even by heating at a temperature of more than 600° C., the carbon content in the obtained synthetic quartz glass powder can be suppressed to a low level, therefore even by using a dry gel containing a large amount of carbon without treating it in advance by steam or water before eliminating the pores by heating, the synthetic quartz glass powder of the present invention as above described can be easily obtained.

DETAILED DESCRIPTION OF THE INVENTION

Now, the present invention will be described in detail.

First, the synthetic quartz glass powder of the present invention is obtained by a sol-gel method. Here, a sol-gel method is, a method for producing a synthetic quartz glass powder, by heating and eliminating the pore of a silica gel formed by a sol-gel reaction.

As sol-gel method generating silica gel to be a starting material for synthetic quartz glass powder, there are generally: (1) colloid dispersion method, wherein a silica sol is prepared by dispersing e.g. fumed silica in water and gelled, and (2) hydrolysis method, wherein some silicon compound such as alkoxysilane is hydrolyzed to form a silica gel. Because of the property of the obtained gel, high yield and convenience of the operation, hydrolysis method is preferred.

As a starting silicon compound, e.g. silicon salts, oxides, alkoxides can be employed. Among these, the alkoxides namely alkoxysilanes, are preferably employed, as gel property being excellent, for example contamination can be prevented.

The hydrolysis method more concretely, for example in the reaction container alkoxysilane and high purity water in an amount of equal equivalent to 10 equivalent are charged, and in a stand still state or under stirring, hydrolysis and condensation reaction proceeds, and the silica gel is obtained.

Any alkoxysilane, as far as it can be subjected to a hydrolysis reaction, can be employed, but those that do not contain any alkyl group directly attached to the silicon atom, such as tetramethoxysilane or tetraethoxysilane, are preferable, because of the gel property and capability of reducing carbon content.

To accelerate reaction, an acid or an alkali catalyst may be employed. In this case, catalysts which do not contain metal are preferred, so generally organic acid or ammonia water etc. are preferred.

Thus obtained silica gel is usually a wet gel containing several dozens weight percent of water, suitable as a precursor of high purity synthetic quartz glass for semiconductor use, optical fiber, etc., because metal impurities content like alkali metal such as Na, K can be suppressed to an extremely low level, by using a thoroughly purified starting material.

The wet gel can be dried in advance, or directly be pulverized, and regulated to the arbitrary size distribution. Particle size distribution of the gel dominates the obtained synthetic quartz glass powder, so by estimating the particle size distribution of the objected synthetic quartz glass powder and considering shrinking by drying and pore elimination, the optimum particle size can be decided.

Usually wet gel of at most 1000 micron, preferably at most 900 micron is obtained, and heated to at least 100 ° C. and water and organic component such as alcohol formed by hydrolysis reaction are removed, and a dry gel with liquid content of at most 30 wt %, preferably at most 20 wt %, more preferably from 1 to 10 wt % is obtained. By sieving in advance or following this heating, so that the dry gel of from 100 to 500 micron is obtained, the particle size distribution of the synthetic quartz glass powder obtained by calcination can be regulated into a favorable range.

Here it is preferable to have a dry gel obtained by the above described sol-gel reaction and that the number of the abnormal particles be at most 200 particles per 10 g, preferably 100 particles per 10 g. Here, an abnormal particle is, a particle which apparently can not be distinguished from the usual silica gel obtained by a sol-gel reaction, but is the hard and firmly solidified scale adhered to the inner wall of the reaction apparatus used for the sol-gel reaction, which has exfoliated and has been included by the contact with the normal product of the sol gel reaction. It is considered that, the main component of this abnormal particle made of the exfoliated and included scale consists mainly of siloxane bond(Si-O-Si), similarly to the silica gel as product of normal sol gel reaction, but many of the organic groups such as alkyl group or alkoxy group derived from starting silicon material are remaining in the abnormal particle, and the said abnormal particle being so solidified that these organic groups remain as carbon component even when calcined and are moreover difficult to be removed. Also, such abnormal particle often includes metal component consisting the apparatus inner wall, so the obtained synthetic quartz glass powder and consequently the obtained shaped glass product obtained by fusing the above synthetic quartz glass powder, have high possibility of metal impurity contamination.

Such abnormal particle contains an abnormal high level of carbon content that is not easily removed, so when heated at 800° C. for 15 minutes under nitrogen flow, abnormal particles can be easily detected and counted with naked eyes as black spot.

To control the number of such abnormal particles, those included into the gel may be removed, but it is preferable to prevent inclusion in course of gel preparation. To attain this object, it is convenient to employ a reaction apparatus, namely reaction container, piping, pulverizer, dryer, etc., the apparatus having the part of inner wall contacting with liquid and/or gel, said part of inner wall having scale layer suppressed to at most the exfoliation limit thickness. To suppress the scale layer to at most the exfoliation limit thickness means to suppress the thickness of the scale layer in a range that the exfoliation and coming off of the scale can be substantially neglected, usually at most 2 mm. Therefore, when the scale layer thickness becomes more than 2 mm, the inner wall is washed. The washing method is not limited as far as it can maintain the scale thickness to at most the exfoliation limit thickness, for example alkali washing. To wash efficiently, it is preferable to heat the alkali water (generally sodium hydroxide) to at least 50° C., preferably at least 70 ° C.

Washing time is from 30 minutes to 10 hours, preferably from 1 to 4 hours, and after alkali washing, washing is conducted with pure water for several times to several dozens of times. Besides alkali washing, washing by silica gel slurry, a similar material as the scaling, is also effective. Also, as far as the thickness of the scale layer be at most the exfoliation limit thickness, the scale layer constitutes an effective protection layer of the inner wall parent material. Therefore it is preferable to maintain the thickness of the scale layer to at least 10 $\mu$m.

Thus obtained silica gel of the present invention, is furthermore heated, so that the carbon of remaining group and silanol be removed, and pore be closed to obtain the synthetic quartz glass powder of the present invention. Namely synthetic quartz glass powder with black spot particles number of at most 5 particles per 50 g. Here, it is important that the scaling material to be remaining as unburned carbon be reduced, so that the number of black spot particles in the product be 5 particles per 50 g. As the black spot particle can be easily confirmed with naked eyes, the number of black spot particles can be easily counted, by spreading 50 g of the product all over in a container such as laboratory dish, tray, etc., concretely about several milimeter, preferably at most about 1 milimeter.

Favorable synthetic quartz glass powder usually has a particle size distribution of from 75 to 700 micron, preferably from 75 to 400 micron (at least 90 wt % is in the above particle size distribution), carbon content of at least 5 ppm and silanol of at most 50 ppm. By calcining the silica gel of the present invention, wherein the number of the abnormal particles is controlled, a synthetic quartz glass powder having such favorable range of property and producing shaped glass product with no bubbles when being fused, can be obtained. Furthermore, in a synthetic quartz glass powder obtained by the present invention, impurities of other metal elements are in an extremely low level, for example Fe, Cr are at most 1 ppm, Na, K are at most 100 ppb. This is considered to be because of the inclusion of scale and falling off of impurities from wall material being prevented.

The synthetic quartz glass powder of the present invention can also be obtained by the following method.

The dry gel usually contains from 0.5 to 2 wt % of carbon, but according to the method of the present invention, it can be subjected to the following heat treatment, without being treated by steam or water.

Namely a dry gel containing at least 0.5 wt % of carbon is heated at a temperature of from 100 to 600° C. until the carbon content be not more than 2,000 ppm. Usually the gel is heated until the carbon content becomes from 50 to 2000 ppm, preferably about from 100 to 1500 ppm. As far as the carbon content be in the above described level, the heat treatment operation itself can be a generally used one, for example by filling the gel in a crucible and the air is thoroughly passed, or heated by means of an rotary kiln with inner tube made of quartz with temperature gradient to 500° C., and by continuously supplying the gel and thoroughly passing the air. Usually heating for about 2 hours at a temperature of from 100 to 600° C. is enough, but also it can be carried out under high oxygen content atmosphere, or by passing steam at a temperature at most 200° C., so that carbon removing speed can be accelerated. Then, the temperature is raised to above 600° C., usually at least 1000°, for example about 1200° C., and the carbon content can be at most 5 ppm. Keeping time at a temperature of above 600° C. is not limited, and usually, raising temperature to about 1200° C. in several hours is enough.

Thus obtained synthetic quartz glass powder of the present invention, can be subjected to ordinary method, for example fusion method by oxygen hydrogen flame that is called Verneuil method. Using such a synthetic quartz glass powder with low black spot particles content, shaped product can be obtained, and thus obtained shaped product has high quality with low amount of bubbles formed during the fusion.

EXAMPLE

Now, the present invention will be described in further detail with reference to Examples. However, it should be understood that the present invention is by no means restricted to such specific examples. The carbon content was measured by means of "EMIA610 CS Analyser" (product of Horiba Co. Ltd). The sample powder was fused with a fusing agent, and the amount of generated $CO_2$ was determined by Infrared absorbance method (C generated as CO was fully converted to $CO_2$ by a catalyst).

The method for detecting black spot particles is as follows, and black spot particles means not only those seen as black to the naked eyes, but also e.g. those grey or brown, any particle other than white ones are called black spot particles.

(Black Spot Particles Detection Method)

(1) The powder is spread over in a tray in thickness of about 1 mm, and black spot particles are checked with naked eyes. Then the particles are sucked and removed one by one by means of a volumetric pipet attached to the point of an aspirator.

(2) The tray is shacked to move the powder and the operation described in (1) is repeated. This process is repeated until no black spot particle is detected anymore. In this way, all the black spot particles in the tray are counted.

Example 1

Into a jacket heating type reaction container made of SUS304, tetramethoxysilane and water in an amount of 5 times in equivalent of tetramethoxysilane, were charged, and reacted for 30 minutes at 65° C., and a wet gel was obtained. Then, the wet gel was pulverized with a Cormil type pulverizer made of SUS304, and the obtained pulverized wet gel was charged into a conical dryer made of SUS304, and dried by tumbling at 140° C. for 3 hours, then successively the gel was water-washed and dried in the conical drier for 4 hours. The dry gel was then sieved to a particle size distribution of from 75 to 400 micron.

The above described operation (reaction, pulverization, drying, water-washing, drying and sieving) was repeated for 1 to 50 times. Then the scaling product (scale layer) was observed to be sticking to the inner wall of the apparatus. 10 g of each of the sieved dry gel obtained by the $10^{th}$, $20^{th}$, $30^{th}$, $40^{th}$ and $50^{th}$ operation was weighed minutely, and heat treated in an electric oven under nitrogen gas flow at 800° C. for 15 minutes, then took out of the electric oven. Then the number of black spot particles namely abnormal particles was counted. The number of abnormal particles were: 50 for $10^{th}$, 45 for $20^{th}$, 55 for $30^{th}$, 60 for $40^{th}$ and 70 for $50^{th}$ operation, respectively. Then, each of the sieved dry gel from $10^{th}$, $20^{th}$, $30^{th}$, $40^{th}$ and $50^{th}$ operation was heated from room temperature to 1000° C. in 2 hours in an rotary kiln type quartz inner cylinder electric oven (diameter of core tube: 200 mm; height of the powder layer: 60 mm; rotation number: 4 rpm), under air flow of 45 liters/minute, then a synthetic quartz glass powder was obtained, respectively. 50 g of each of the respective powder was weighed minutely, and the number of black spot particle was counted. 2 for $10^{th}$, 1 for $20^{th}$, 4 for $30^{th}$, 2 for $40^{th}$ and 3 for $50^{th}$ operation.

The metal impurities content of the sieved dry gel obtained by $10^{th}$ operation, was measured. Na and K measured by atom absorption method, were 10 ppb respectively, Cr, Fe measured by ICP (Inductively Coupled Plazma method), were at most 10 ppb and 0.03 ppm, respectively. After $50^{th}$ operation, scale thickness of the inner wall of the conical dryer was measured, which was 1 mm.

Each powder was calcined in a quartz glass crucible, then fused by Verneuil fusing method and shaped glass product of 10 g was obtained, respectively. Each of these shaped products had extremely low bubble content, namely at most 1 bubble, and was worthy of practical use, respectively.

Comparative Example 1

The same operation as Example 1 (reaction, pulverization, drying, water-washing, drying and sieving) was repeated for 100 times. 10 g of the sieved dry gel was weighed minutely and heat treated in an electric oven at 800° C. for 15 minutes under nitrogen gas flow, then took out of the oven and the number of black spot particle namely abnormal particle was counted, which was 255. Then, sieved dry gel obtained by $100^{th}$ operation was calcined in the same way as in Example 1 in an rotary kiln type quartz inner tube electric oven under air flow, then the number of black spot was counted, which was 21. Then this powder was calcined in an quartz glass crucible at 1200° C. for 60 hours, then fused by Verneuil fusing method and a shaped glass product of 10 g was obtained. The obtained shaped product contained many bubbles (100 bubbles in the shaped product) and was not worthy of practical use.

The thickness of the scale of the inner wall of the conical dryer after $99^{th}$ operation exceeded 2 mm.

Example 2

The same operation as Example 1 (reaction, pulverization, drying and sieving) was repeated for 100 times. Then overall apparatus was washed with sodium hydroxide (0.1% liquid) at 80° C. for 3 hours under vacuum, to remove scale from inner wall of the apparatus. First time operation after alkali washing (namely $101^{th}$ reaction when summed up with the operation prior to the alkali washing), reaction, pulverization, water-washing, drying and sieving was conducted, in the same manner as in Example 1. And by 800° C. heating conducted in the same manner as in Example 1, the number of abnormal particles detected as black spot was 2 in 10 g of gel.

This sieved dry gel was calcined in the same manner as in Example 1, then the obtained synthetic quartz glass powder contained 0 black spot particle in 50 g. this synthetic quartz glass powder was fused in the same manner as in Example 1 into an ingot of 10 g. The obtained ingot had good property with no bubble.

Example 3

The sieved dry gel obtained by $10^{th}$ operation of the Example 1 was charged into an rotary kiln type quartz inner tube oven, and heated from 100 to 500 OC in 1 hour, then kept at 500° C. for 1 hour, so that the carbon content be 500 ppm. Thus obtained silica powder was heated to 1000° C. in 2 hours in a similar rotary kiln then a synthetic quartz glass powder was obtained. Thus obtained synthetic quartz glass powder had carbon content of at most 5 ppm which is under detection lower limit. 50 g of this synthetic quartz glass powder was observed with naked eyes, and was confirmed that the number of black spot was 0. This synthetic quartz glass powder was fused by Verneuil method which is an ordinary method, and a shaped glass product of 10 g was obtained. By an observation with naked eyes, the number of bubbles in this shaped product was 0.

Comparative Example 2–4

The same operation as Example 3 was carried out except that at a temperature of from 100 to 500° C., heating was carried out for 10 minutes, 20 minutes and 30 minutes respectively, and silica powder with carbon content of 8,000 ppm, 5,000 ppm and 3,000 ppm was obtained, respectively. As the result, the obtained synthetic quartz glass powder had carbon content of 10 ppm respectively, but the number of black spot in 50 g of each synthetic quartz glass powder was 200, 100, 50, respectively.

Each of the shaped glass product obtained by Verneuil method using the above described synthetic quartz glass powder contained many bubbles (at least 50 bubbles in a shaped product of 10 g), and was not worthy of practical use.

The Effect of the Invention

According to the present invention, synthetic quartz glass powder with low impurities content and high quality which no bubble appears when fused, can be obtained.

We claim:

1. A method for producing a synthetic quartz glass powder from a silica gel containing pores obtained from a sol-gel reaction by heating and eliminating pores and black spots of said silica gel comprising:

(a) heating the silica gel containing at least 0.5 wt % carbon content at a temperature in the range of 100–600° C. until the carbon content of said gel is at most 2,000 ppm and then (b) further heating the gel at a temperature of above 600° C. until said synthetic quartz glass powder has black spot particles content in an amount of at most 5 particles per 50 g.

2. The method for producing a synthetic quartz glass powder according to claim 1, wherein the carbon content is at most 5 ppm when heating at a temperature above 600° C.

3. A method for producing a quartz glass shaped product from a synthetic quartz powder obtained from a sol-gel reaction containing pores and black spots by heating and eliminating pores and black spots from a silica gel and said synthetic quartz glass powder is fused into a quartz glass shaped product, comprising:

(a) heating the silica gel containing at least 0.5 wt % carbon at a temperature in the range of 100–600° C. until the carbon content of said gel is at most 2,000 ppm and then (b) further heating the gel at a temperature of above 600° C. until said synthetic quartz glass powder contains black spot particles in an amount of at most 5 particles per 50 g.

4. The method for producing a synthetic quartz glass powder according to claim 1, wherein the synthetic quartz glass powder has a content of at most 1 ppm of Fe and Cr, a content of at most 100 ppb of Na and K.

5. The method for producing a synthetic quartz glass according to claim 1, wherein said silica gel is obtained from a sol-gel reaction using an apparatus having a part of an inner wall which contacts liquid or silica gel, said part of the inner wall having a scale layer of a thickness of at most its exfoliation limit.

6. The method for producing a synthetic quartz glass powder according to claim 5; wherein the inner wall of said apparatus is alkali-washed.

7. The method for producing a synthetic quartz glass powder according to claim 1, wherein step (b) is carried out in the absence of steam and under a nitrogen gas flow.

* * * * *